United States Patent [19]
Blankenship

[11] 3,943,579
[45] Mar. 16, 1976

[54] INCINERATOR TOILET

[75] Inventor: Ernest Bayne Blankenship, Dallas, Tex.

[73] Assignee: Research Products/Incinolet Corporation, Dallas, Tex.

[22] Filed: July 1, 1974

[21] Appl. No.: 484,954

Related U.S. Application Data

[63] Continuation-in-part of Ser. No. 445,662, Feb. 25, 1974.

[52] U.S. Cl. ........................... 4/131; 110/9 E
[51] Int. Cl.² ........................... A47K 11/02
[58] Field of Search .......... 4/131, 118, 217, 213; 110/9 R, 9 E; 219/541

[56] References Cited
UNITED STATES PATENTS

| | | | |
|---|---|---|---|
| 2,771,533 | 11/1956 | Osberg et al. | 110/9 E |
| 3,020,559 | 2/1962 | Blankenship et al. | 4/131 |
| 3,169,497 | 2/1965 | Blankenship | 110/9 E |
| 3,251,070 | 5/1966 | Blankenship | 4/131 |
| 3,259,732 | 7/1966 | Jepson | 219/541 X |
| 3,444,355 | 5/1969 | Tyler | 219/541 X |
| 3,466,427 | 9/1969 | Burger | 219/541 X |
| 3,474,468 | 10/1969 | Blankenship | 4/131 |
| 3,486,174 | 12/1969 | Nordstadt et al. | 4/131 |
| 3,569,671 | 3/1971 | Henning et al. | 219/541 X |
| 3,600,724 | 8/1971 | Stamper et al. | 4/217 |
| 3,633,220 | 1/1972 | Lagstrom | 4/131 |
| 3,675,250 | 7/1972 | Bengtsson | 4/111 |
| 3,752,090 | 8/1973 | Frankel | 110/9 R |

*Primary Examiner*—Henry K. Artis
*Attorney, Agent, or Firm*—Arthur F. Zobal

[57] ABSTRACT

The specification discloses an incinerator toilet comprising an incinerator chamber formed by inner and outer walls each of which are formed from a single cylindrical piece of drawn metal and which have their upper and lower ends connected together forming an enclosed and surrounding chamber for holding heat insulation material. An electrical heating coil is removably supported within the chamber with its terminal ends extending outward through the inner and outer walls. A vent line has a first end which extends through the inner and outer walls of the incinerator chamber to the interior thereof and a second end which extends to a position outside of the outer wall. A blower is located outside of the chamber for drawing gases from the interior thereof by way of the vent line. An odor reducing heat activated catalyst is located in a container between the blower and the outer wall of the chamber and in the flow path of gases passing through the vent line. In addition, the vent line is in fluid communication with the enclosed and surrounding chamber in which is located the heat insulation materials.

18 Claims, 11 Drawing Figures

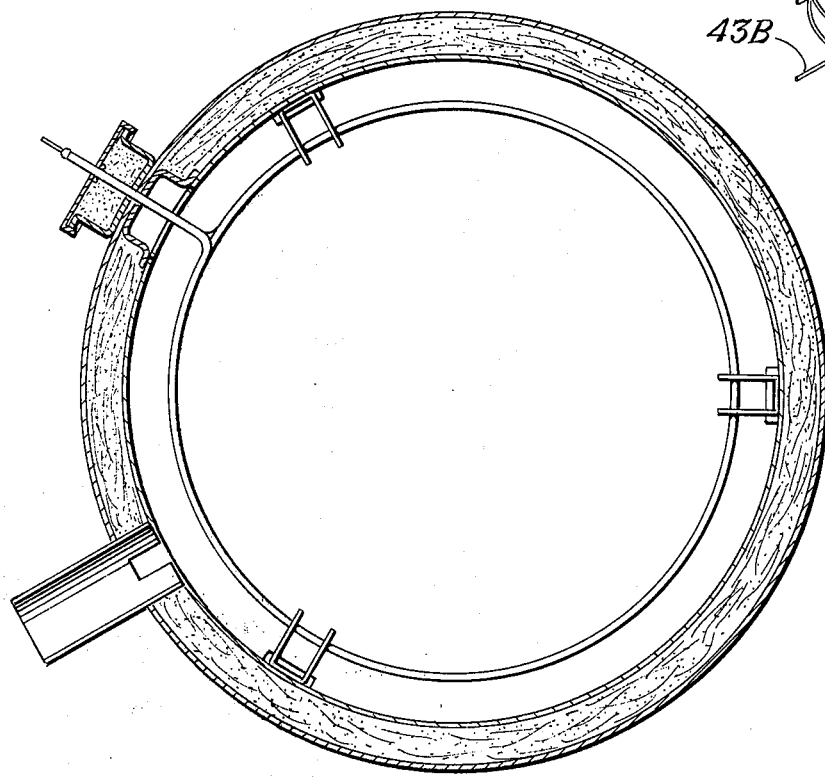

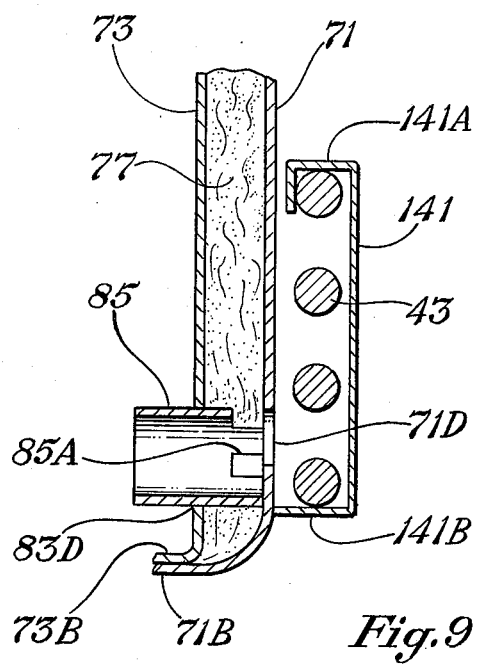
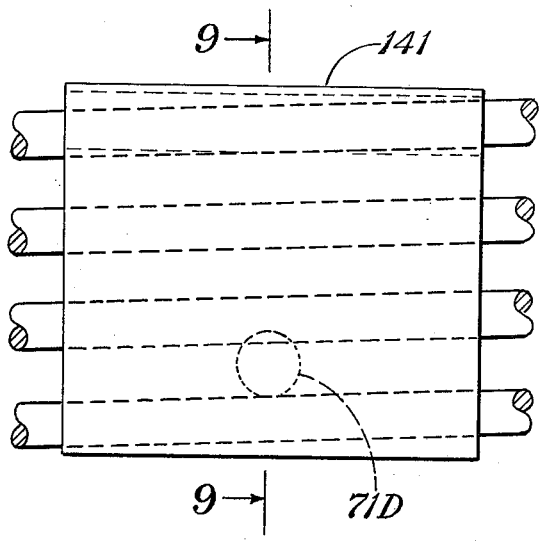
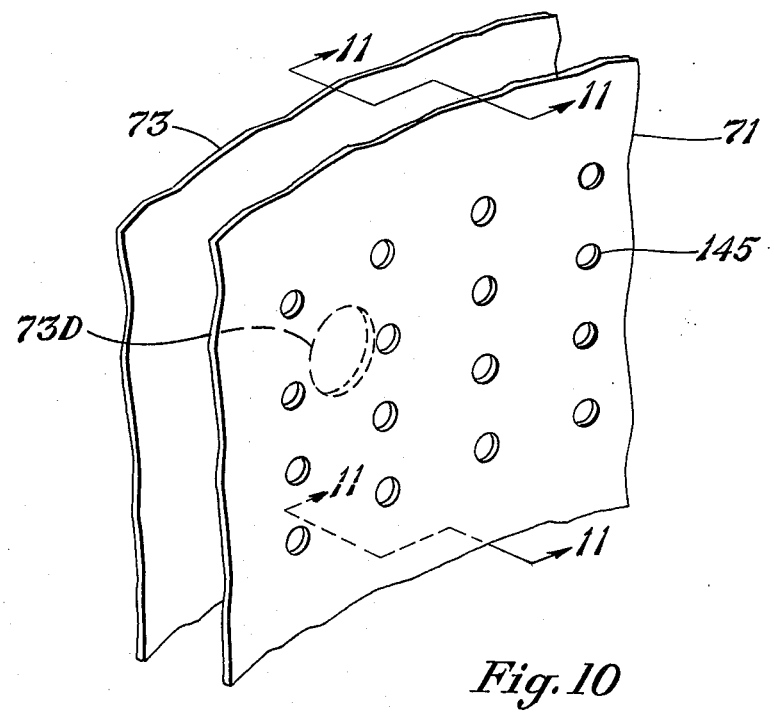
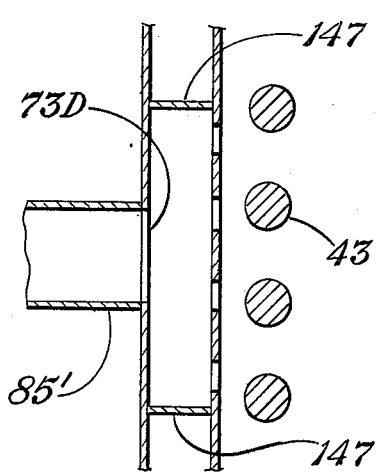

INCINERATOR TOILET

This application is a continuation-in-part of U.S. patent application Ser. No. 445,662, filed Feb. 25, 1974.

BACKGROUND OF THE INVENTION

This invention relates to an incinerator toilets employing features which facilitate their construction and repair and which also increase their lifetime and effectiveness.

In the past, incinerator chambers used in incinerating toilets have been constructed to incorporate a pellet type, heat activated catalyst between the inner and outer metal walls of the chamber. Usually, a portion of the inner and outer walls are perforated so that odors can be drawn through the walls and across the catalyst, thereby being rendered innocuous. Perforations in the walls, however, substantially reduce the strength of the walls to the effects of heating and cooling. To overcome this loss of strength, the walls are reinforced in various ways including the use of heavy straps spot welded about the girth of the inner wall. This construction technique increases the cost of the toilets.

The use of perforated walls also limits the method of fabrication of the incinerator chamber. For example, the walls must first be perforated while flat, and then rolled into a cylinder and welded, and finally assembled together with the use of annular top and bottom closure members to form a completed chamber, requiring many time consuming operations. Moreover, since the chamber is made up of a number of pieces welded together, small openings may exist through the many welded joints thereby allowing odor to penetrate the inner wall, traverse the annular space, and exit through the outer wall into the atmosphere, completely bypassing the catalyst.

These incinerator chambers also have other disadvantages in that their electric heating elements have been held in place by brackets bolted to the walls of the incinerator chamber. Replacement of the heater coil requires the entire toilet unit to be almost completely dismantled, which is undesirable, particularly, if replacement must be done in the field.

Other problems which have occurred is the fact that the inner and outer walls of the incinerator chamber expand and contract differently, resulting in a crushing effect on the catalyst located between the walls. The catalyst therefore becomes eroded and hence can become ineffective.

SUMMARY OF THE PRESENT INVENTION

It is an object of the present invention to provide an incinerator toilet constructed such as to overcome the above disadvantages. In one aspect, the incinerator chamber is formed from inner and outer walls, each of which are formed from a single annular piece of drawn metal. The inner and outer walls are connected together only at their upper and lower ends forming an enclosed and surrounding chamber in which heat insulation material is located. The heat activated catalyst is located exterior of the chamber walls. In this respect, there is provided a vent line which extends through the inner and outer walls to the interior of the chamber. A pressure reducing means is located exterior of the chamber walls for drawing gases from the chamber by way of the vent line. The catalyst is located in a container between the pressure reducing means and the outer wall of the incinerator chamber and in the flow path of the gases flowing through the vent line. The vent line is also in fluid communication with the enclosed surrounding chamber in which the heat insulation material is located in order to evacuate odor and gases which may leak into the annular space between the inner and outer chamber walls.

In the preferred embodiment, the inner and outer walls of the incinerator chamber have at their upper ends inwardly extending flanges connected together and at their lower ends outwardly extending flanges connected together with the intermediate portions of the inner and outer walls spaced apart forming the enclosed and surrounding chamber in which is located the heat insulation material. The inwardly extending flanges extend downwardly below the level of the upper end of the incinerator chamber forming a recessed seat for supporting a lid.

In a further aspect, there is provided an electrical heater coil removably mounted within the incinerator chamber to allow easy and rapid installation and replacement of the heater coil. The electrical coil has two spaced extending terminals which are adapted to be readily inserted through openings formed through the inner and outer walls to facilitate replacement. A small container containing insulation material is secured to the outside of the exterior wall with openings formed therethrough to receive the spaced terminal ends of the heater coil.

BRIEF DESCRIPTION OF THE DRAWINGS

FIG. 2 is an exploded view of the incinerator chamber employed in the toilet of FIG. 1;

FIG. 3 is an exploded view of the electrical heating coil and its supporting brackets employed in the incinerator chamber of FIGS. 2 and 3;

FIG. 4 is a cross-sectional view of the incinerator chamber of FIG. 1 taken through its vent line and through its sealing pans and also showing a top view of its electrical heating coil;

FIG. 5 is a side view of one of the brackets employed for securing the electrical coil within the incinerator chamber;

FIG. 6 illustrates a slot formed in the inner wall of the incinerator chamber in which the lower tab of the bracket of FIG. 5 may be inserted for holding the bracket in place;

FIG. 7 is an enlarged cross-sectional view of a portion of the inner and outer walls of the incinerator chamber with the electrical coil terminals extending therethrough and through an outer container filled with heat insulation material;

FIG. 8 illustrates a modification of the incinerator toilet of the present invention;

FIG. 9 is a cross-section of FIG. 8 taken through the lines 9—9 thereof;

FIG. 10 is a perspective view of a portion of the chamber walls illustrating a further modification of the incinerator toilet of the present invention. In FIG. 10 the heater coil is not shown for purposes of clarity;

FIG. 11 is a cross-sectional view of FIG. 10 taken through the lines 11—11 thereof.

DETAILED DESCRIPTION OF THE INVENTION

Figure 1:
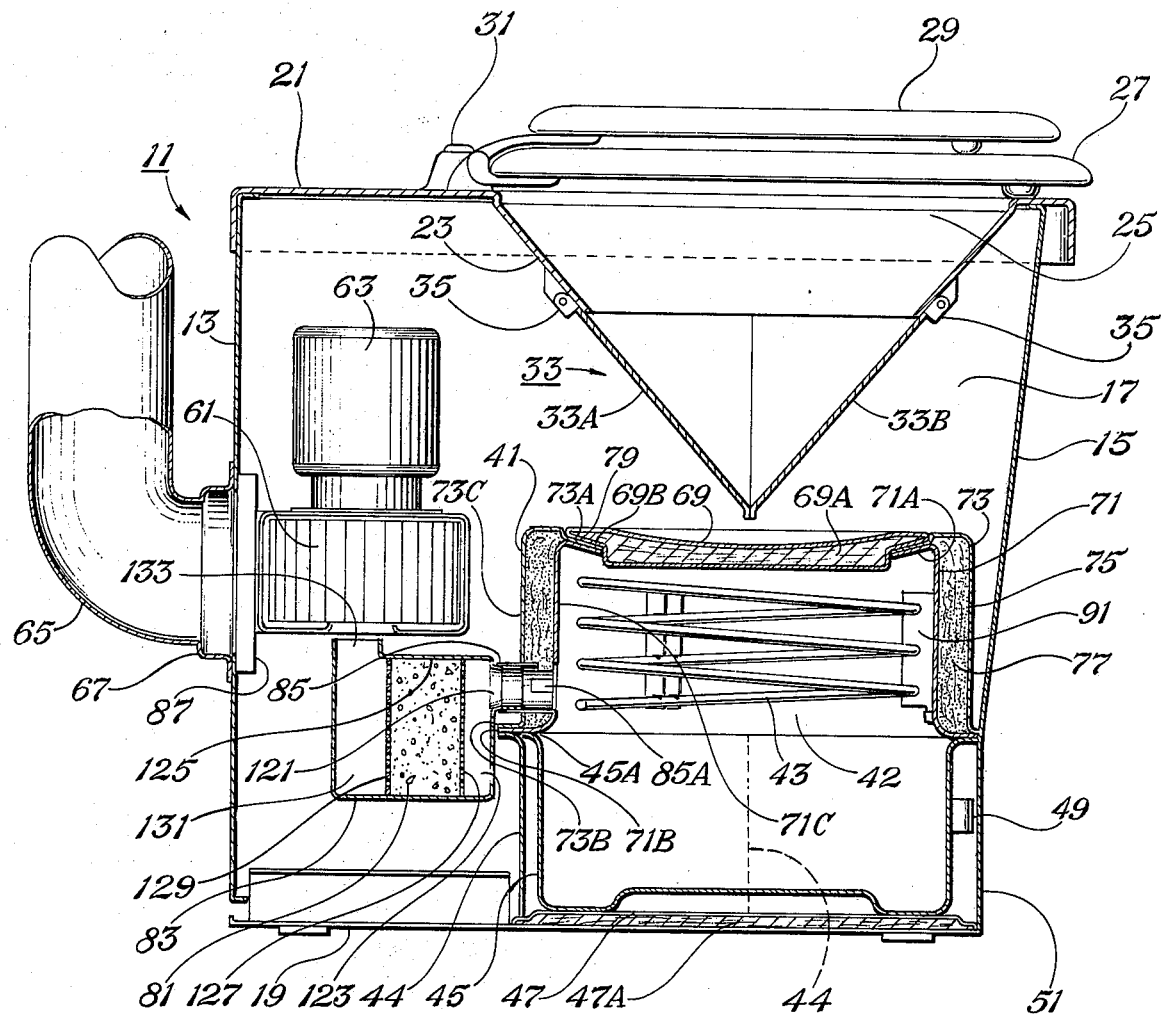
FIG. 1 is a cross-sectional side view of the incinerator toilet of the present invention.

Referring to FIG. 1, the incinerator toilet comprises a housing 11 formed by a rear wall 13, an arcuate front wall 15, two side walls, one of which is identified at 17, a bottom wall 19, and a top 21. The front, rear, sides and bottom walls and the top 21, are preferably formed of mild steel. The forward portion of the top 21 includes a recessed upper bowl portion 23 forming an upper opening 25 which extends downward from the top 21. Located above and around the bowl 23 is a hinged seat 27 adapted to be located in the position shown or moved to an upward position. A hinged lid 29 is adapted to fit over the seat 27. The lid 29 also may be moved to an upward position independently of the seat. Both the seat 27 and the lid 29 are hinged to the top 21 by way of a hinge arrangement illustrated at 31. A lower bowl portion 33 is located below the upper bowl portion 23 and is transversely divided into two halves 33a and 33b which are pivotally mounted on the outer surface of the upper bowl portion 23 by way of hinges 35. When the toilet is being used, the halves 33a and 33b will be in their closed position whereby a cone shaped paper insert may be located within the bowl formed by the upper portion 23 and the lower portion 33.

The incinerator toilet comprises an open ended incinerator chamber member 41 located below the bowl and which has a circular electrical heating coil 43 located in its central opening 42. The chamber 41 is mounted on a semi-circular metal support 44. An ash pan 45 is slidedly mounted on a metal step support 47 formed on the housing bottom 19 within the chamber support 44 and below the central opening of the chamber member 41. Heat insulation material 47a is located between support 47 and the bottom 19. The ash pan 45 has a handle 49 on its front side which is accessible by means of a removable panel 51 located beneath the arcuate front wall 15. A blower wheel 61 and a motor 63 are provided for drawing gases and odor from the interior of the chamber 41 and then blowing the odor and gases out of a rear vent 65 which is connected to the rear wall 13 of the housing 11 by way of a collar 67. An incinerator chamber lid 69, which fits into a recessed seat formed at the upper end of the chamber 41, is provided for closing the upper end of the chamber 41 while the heater 43 is being energized for disposing of the waste received in the pan 45. The outer walls of the lid 69 are formed of stainless steel with heat insulation material 69a located within the walls.

When the incinerator toilet is being used by a person, the lower bowl halves 33a and 33b will be located in their closed position as shown in FIG. 1 and a cone shaped paper insert located within the upper bowl portion 23 and lower bowl portion 33. When it is desired to deposit the waste in the paper cone within the pan 45, the chamber lid 69 will be raised upward and out of its recessed seat and then swung to the side and out of the way to allow the hinged halves 33a and 33b to swing open to allow the paper cone and waste to drop through the central opening 42 of the chamber 41 and into the pan 45. A linkage mechanism controlled by a foot pedal for allowing the bowl halves 33a and 33b and the chamber lid 69 to operate in this manner is disclosed and claimed in my co-pending application Ser. No. 87,413, filed Nov. 6, 1970 and entitled "Incinerator Toilet Having a Vertically Movable Incinerator Chamber Lid". After the paper cone and waste has been deposited in the pan 45, the foot pedal again will be actuated to return the chamber lid 69 to its closed position and to return the bowl halves 33a and 33b to their closed positions. A switch then may be actuated to complete a circuit to the electrical coil 43 and to the blower motor 63. Suitable electrical circuits for electrically controlling the coil 43 and the blower motor 63 are disclosed in my previously issued U.S. Pat. No. 3,020,559, dated Feb. 13, 1962 and No. 3,251,070, dated May 17, 1966.

Referring now to FIGS. 1 and 2, the incinerator chamber 41 is formed by cylindrical inner and outer members 71 and 73. These members are single piece members drawn and shaped from stainless steel. As illustrated, inner and outer members 71 and 73 have inward extending flanges 71a and 73a located at their top ends and outwardly extending flanges 71b and 73b located at their lower ends. Ridges 71e are formed on inner member 71 for structural support. In assembly, the inner member 71 is inserted within the outer member 73 and inwardly extending flanges 71a and 73a are welded together while outward extending flanges 71b and 73b are welded together. Thus, only two primary seams are employed in forming the chamber thereby facilitating construction. Due to the shape of the two members 71 and 73, the intermediate wall portions 71c and 73c between the upper and lower flanges will be spaced apart forming an enclosed annular chamber 75. During assembly of the inner and outer members 71 and 73, a heat insulation material 77 will be located within this chamber to provide insulation against the heat generated by the electrical heating coil 43. In one embodiment, the heat insulation material 77 may be fibrous or hair-like material such as mineral wool. It is noted that the inwardly extending upper flanges 71a and 73a extend downwardly forming a recessed seat 79 for supporting the chamber lid 69. Seat 79 mates with the annular bottom surface 69b of the lid 69 to prevent or minimize the leakage of gases or odor therebetween. The half cylindrical wall plate 44 is welded to the bottom flange 71b for providing the desired support for the incinerator chamber 41. The upper end 45a of the pan 45 flanges outward forming a flat, annular surface which will be in contact with the bottom flange 71b of the chamber 41 to prevent or minimize the leakage of gas or odor therebetween.

During incineration by the coil 43, gases and odors are drawn from the chamber and through and across a heat activated odor reducing catalyst 81 located in a container 83 which is positioned outside of the walls forming the incinerator chamber 41. The gases are drawn through the catalyst 81 within the container 83 by way of a vent line or exhaust tube 85 and an exhaust fan or blower wheel 61 driven by the motor 63. As illustrated in FIG. 2, the inner and outer walls 71 and 73 of the incinerator chamber have circular apertures 71d and 73d formed therethrough and which are located to be in alignment when the inner and outer walls are assembled together. After assembly, the exhaust tube 85 is inserted through apertures 73d and 71d and welded to the inner and outer walls thereby providing a flow path from the interior of the chamber through the exhaust tube 85. The other end of the exhaust tube 85 is in fluid communication with the interior of the container 83 through an inlet 121 which leads to a diffusion chamber 123. The catalyst 81 comprises heat activated aluminum oxide pellets which are located in a catalyst chamber section 125 between front and rear perforated plates 127 and 129. Downstream of the rear plate 129 is a gas collection or diffusion chamber 131 which leads to an outlet 133. The outlet 133 is in fluid communication with blower 61. The catalyst container 83 is more fully described and claimed in my co-pending U.S. patent application, attorney docket 409-10, entitled "Catalyst Container in Incinerator Toilet". Vent 65 is coupled to the blower 61 by way of collar 67 and connection 87. Thus, when the blower 61 is driven by motor 63, odors and gases will be drawn from the interior of the chamber 41 through the exhaust line 85 into inlet 121 and diffusion chamber 123 and then through and across the catalyst 81 located between perforated plates 127 and 129 for effective odor reduction. From the catalyst, the gases will be drawn into diffusion chamber 131 through outlet 133 and then forced by the blower outward through the vent line 65. Thus, with this arrangement, the catalyst is located outside of the walls 71 and 73 of the incinerator chamber 41 whereby differences in expansion and contraction of the incinerator chamber walls will not effect the catalyst thereby prolonging its effectiveness as an odor reducing means. It is noted further that the vent line 85 has slots 85a formed in its forward end and which are located within the annular insulating chamber 75. Thus, any gases or odors which may have leaked or passed into annular chamber 75 also will be drawn out through the exhaust line 85 and across the catalyst 81 in the container 83.

Referring also to FIGS. 3–6, the arrangement for supporting the electrical heater coil 43 within the chamber 41 comprises three removable brackets 91, which are U-shaped in cross section. The coil 43 is formed of three turns and has extending terminal ends 43a and 43b which are also defined as the "cold" ends. The outwardly extending parallel side walls of the brackets 91 each have three slots 91a adapted to receive the three turns of the heater coil 43. In addition, the lower ends of the brackets 91 have downwardly extending tabs 91b. These tabs in turn are adapted to be inserted into inwardly extending slots 93 formed on the inside of the inner wall 71c of the incinerator chamber. Thus, the brackets 91 may be secured to the inner wall 71c of the incinerator chamber to locate the heater coil within the chamber at a position spaced inward from its inner wall. By removing the bracket tabs 91b from the slots 93, the brackets and hence the coil may be removed from the chamber 41 for replacement purposes. When the coil 43 is located within the chamber 41 in its operative position, its terminal ends 43a and 43b extend outwardly through the inner and outer walls 71c and 73c where they are attached to electrical power leads.

Referring specifically to FIGS. 2, 4, and 7, there will now be described an arrangement for facilitating the insertion of the terminal ends of the coil 43 through the inner and outer walls of the chamber 41 thereby facilitating removal and replacement of the coil 43 for servicing. A large square shaped aperture 101 is formed through the inner wall 71c and two spaced apertures 103a and 103b are formed through the outer wall 73c. When the inner and outer members 71 and 73 are assembled, the apertures 103a and 103b will be in alignment with the large aperture 101. Also provided is an inner cup-shaped member or pan 105 and an outer cup-shaped member or pan 107. Member 105 has two small apertures 105a and 105b formed in its back end 105c and a large opening 105d formed in its front end surrounded by a flange 105e. The back end of the pan 105 is welded to the inside surface of the outer wall 73c such that apertures 105a and 105b are in alignment with apertures 103a and 103b. In addition, the front flange 105e is welded to the outside of the inner wall 71c such that its opening 105d is in alignment with the aperture 101. Pan 107 also has two small apertures 107a and 107b formed in its back end 107c and a large opening 107d formed in its front end surrounded by flange 107e. Opening 107d is adapted to be closed by a lid 109 which may be press fitted to the flange 107e and removed therefrom. The back end 107c is welded to the outside surface of the outer wall 73c such that apertures 107a and 107b are in alignment with apertures 103a and 103b. The lid 109 has a pair of small apertures 109a and 109b for receiving the terminal ends 43a and 43b of the coil. Located within the pan 107 is heat insulation material 111 which may be hair-like mineral wool.

When assembling the heater coil in place, the lid 109 will be removed. The heater coil will first be located within the slots 91a of the three heater brackets 91 such that the brackets 91 are located 120° apart. The coil and the brackets then will be tilted as the assembly is inserted in the interior of the chamber 41 to allow the terminal ends 43a and 43b to be inserted through the larger aperture 101; through the smaller apertures 105a, 103a, 107a, and 105b, 103b, 107b; and then out through the large opening 107d of the pan 107. The heat insulation 111 then may be inserted within the pan 107 and packed around the terminal ends after which the lid 109 may be inserted in place. Suitable heat resistant flexible seals 113, 115, and 117 may be provided to insure minimum of heat loss through the sealing pan 107.

Since the backs of both pans 105 and 107 are welded on opposite sides of outer wall 73c, the three layers 105c, 73c, and 107c form in effect a single thin layer which has two openings for receiving terminal ends 43a and 43b of coil 43. Since opening 101 is large, the terminal ends of the coil may be readily inserted through the large opening 101 and then through the two openings formed through layers 105c, 73c, and 107c. Since lid 109 is removable, it may be readily inserted in place around the coil terminal ends after they are inserted through the inner and outer walls of the chamber to insure proper heat insulation and to prevent the escape of gases or odor which may pass into the annular chamber 75. Hence threading of the two terminal ends of the coils through two pairs of small spaced openings is avoided yet sufficient heat insulation and sealing is provided by the exterior sealing pan 107 and its lid 109.

As mentioned above, the toilet disclosed employs a recessed seat 79 formed at the top of the incinerator chamber 41 to support the chamber lid 69. The use of the recessed seat to support the lid has advantages in that it will allow liquid to drain inward and down into the pan 45 rather than on the floor of the toilet in the event that the paper insert leaks or the toilet is improperly used and moreover results in a reduction of the height of the total toilet system. It is noted that U.S. Pat. No. 3,020,559 discloses two semicircular chamber lid sections which may be moved by linkages and a foot pedal for opening and closing the two hinged halves of a conical shaped bowl. Although such an arrangement does not employ a recessed seat for its chamber lid and hence does not have the advantages mentioned above, the arrangement of U.S. Pat. No. 3,020,559 may be employed in the present toilet to control the opening and closing of the bowl halves 33a and 33b. In such an arrangement, the lid 69 will be formed in two sections which will seat on the top of the chamber 41.

It is to be understood further that the lower bowl 33 may be a solid, conical shaped member with a lower aperture formed therethrough whereby the incinerator toilet will be used only as a urinal. In this embodiment, at least one of the flanges 71a or 73a will extend inward an amount further than that shown in FIG. 1 to form or define a much smaller central aperture through the flange. A top metal plate with a small central opening will be welded to the top of the chamber 41 and heat insulation material located between this top plate and the flange 71a or 73a defining the much smaller opening. A metal tube will extend from the lower aperture formed in the conical shaped bowl; through the aperture formed in the top plate; through the central openings formed in flanges 71a and 73a; and into chamber 41.

The lid 69 will not be employed and the linkage mechanism and foot pedal for raising and lowering the lid and for controlling bowl halves will not be needed.

Although the catalyst employed was described as aluminum oxide (Al$_2$O$_3$) pellets, it is to be understood that other types of heat activated catalysts may be used or mixed with the aluminum oxide.

Referring now to FIGS. 8–11 there will be described two embodiments for intensifying the heat of the effluent gases before passage through the heat activated catalyst to increase the efficiency of the catalyst in reducing odor. Referring first to the embodiment of FIGS. 8 and 9, there has been added a metallic plate 141 which is adapted to be coupled to the coil 43 on its inside in front of the exhaust tube aperture 71D formed through the inner wall 71. In addition the exhaust tube aperture 71D has been made smaller and effectively raised in elevation relative to the coil 43. The purpose of the plate 141 is to require the odor to flow around the plate and then over an increased heater coil surface area before flowing through the aperture 71D. This increases the dwell time of the gas to an increased heated surface thereby intensifying the heat of the gaseous odor before it is drawn into the heat activated catalyst. Since the plate 141 is in contact with the heater coil 43 it also will be heated thereby further increasing the heat intensification of the gaseous odor.

In one embodiment, the opening 71D (of FIGS. 8 and 9) may have a total cross-sectional area of about 1.12 square inches while the plate 141 may have dimensions of about 3 inches by 4 inches. Thus plate 141 has a cross-sectional area much greater than the cross-sectional area of the opening 71D. The plate 141 is removably coupled to the coil 43 by way of an upper hook-shaped flange 141A which fits over the upper coil turn. The lower end of the plate 141 has a flange 141B which is adapted to contact the inner wall 71 to prevent the gas from flowing directly upward to the opening 71D. For servicing purposes the plate 141 may be easily removed from the coil 43.

Referring to the embodiment of FIGS. 10 and 11, heat intensification of the gases is accomplished by way of a plurality of small apertures 145 formed through the inner wall 71 and which are substituted for the opening 71D. The opening 73D also is formed through the outer wall 73 at a position elevated from that of the embodiments of FIGS. 1–9. The small openings 145 are formed through inner wall 71 over an area in front of the opening 73D and which area is much larger in cross-section than the cross-sectional area of the opening 73D. The exhaust tube 85' is modified in that it does not extend into the enclosed annular chamber 75 but is connected to the outer wall 73 around the opening 73D. In addition wall members 147 are connected between the inner and outer chamber walls 71 and 73 completely around the openings 145 to provide a flow path for the gases from the openings 145 to the exhaust tube 85'. The wall members 147 need not form an air tight passageway between inner and outer walls 71 and 73. Due to the fact that the openings 145 are small and are spread over a large area, the flow rate through any one opening 145 is relatively small which increases the dwell time of the gases in the vicinity of the heater coil 43 and presents the gases to more heater coil surface thereby intensifying the heat of the gases before being drawn into the heat activated catalyst.

In one embodiment, the opening 73D has a diameter of 1½ inches while the diameter of each of the apertures 145 is 3/16 of an inch. They are located an inch apart over an area of 3 inches by 4 inches.

I claim:

1. An incinerator toilet comprising:
   housing structure,
   an incinerator chamber means located in said housing structure and having an upper end and a lower end with a central opening extending therethrough,
   bowl means located above said chamber means,
   a removable pan adapted to be located below said lower end of said chamber means,
   heating means located within said central opening of said chamber member,
   said incinerator chamber means comprising:
   inner and outer walls each of which are formed from a single cylindrical piece of drawn metal,
   said inner and outer walls having at their upper ends inwardly extending flanges connected together and at their lower ends outwardly extending flanges connected together,
   said inner and outer walls having intermediate wall portions between their upper and lower ends which are spaced apart from each other forming an enclosed and surrounding chamber, and
   heat insulation material located in said enclosed and surrounding chamber.

2. The incinerator toilet of claim 1 wherein:
   said inwardly extending flanges extend downwardly below the top level of said upper end of said chamber means.

3. An incinerator toilet comprising:
   housing structure,
   an incinerator chamber means located in said housing structure and having an upper end and a lower end with a central opening extending therethrough,
   bowl means located above said chamber means,
   a removable pan adapted to be located below said lower end of said chamber means,
   said chamber means comprising inner and outer walls having upper ends and lower ends with intermediate wall portions therebetween which are spaced from each other forming an enclosed and surrounding chamber,
   heat insulation material located in said enclosed and surrounding chamber,
   an electrical heating coil adapted to be located within said central opening of said incinerator chamber means at a position spaced inwardly of said inner wall, said heating coil having two spaced extending terminal ends, openings formed through said inner and outer walls for receiving said terminal ends to allow said terminal ends to project outwardly beyond said outer wall of said incinerator chamber means, and a small container of heat insulation material secured to said outer wall and having openings formed therethrough for receiving said terminal ends to allow said terminal ends to extend through said small container and through its heat insulation material.

4. The incinerator chamber of claim 3 wherein:

said inner wall has a single opening for receiving said two spaced terminal ends, and said outer wall has two spaced smaller openings in alignment with said single opening for receiving said two spaced terminal ends.

5. The incinerator chamber of claim 3 comprising:

brackets adapted to be removably attached to said inner wall for removably supporting said coil within said central opening.

6. The incinerator chamber of claim 5 wherein:

said inner wall has a single opening for receiving said two spaced terminal ends, said outer wall has two spaced smaller openings in alignment with said single opening for receiving said two spaced terminal ends.

7. The incinerator chamber of claim 6 wherein said small container comprises:

a cup-shaped member having a first end and an opposite open end, a removable lid adapted to close said open end, said first end of said cup-shaped member having two spaced openings formed therethrough, said first end of said cup-shaped member being secured to the outside of said outer wall of said incinerator chamber means in a position such that said two spaced openings of said first end of said cup-shaped member are in alignment with the two spaced openings formed through said outer wall for receiving said two spaced terminal ends of said coil, said lid having two spaced openings formed therethrough for receiving the two spaced terminal ends of said coil to allow said lid to fit over and close said open end of said cup-shaped member with said two spaced terminal ends of said coil extending outward therefrom.

8. The incinerator chamber of claim 7 comprising:

a second cup-shaped member having a first end and an opposite open end, said first end of said second cup-shaped member having two spaced openings formed therethrough and which correspond with the two spaced openings formed through said outer wall of said chamber means, said second cup-shaped member being located in said annular chamber between said inner and outer walls with its first end secured to the inside of said outer wall with its two spaced openings in alignment with the two spaced openings of said outer wall and with its open end in alignment with said single opening of said inner wall.

9. An incinerator toilet comprising:

housing structure, incinerator chamber means located in said housing structure and having an upper end with an opening for receiving waste substance, heating means located within said chamber means, said chamber means being formed by inner and outer walls having portions spaced from each other forming an enclosed and surrounding chamber, heat insulation material located in said enclosed and surrounding chamber, a vent line in fluid communication with the interior of said incinerator chamber means by way of said inner and outer walls and extending to a position outside of said outer wall, gas removal means located outside of said chamber means for drawing gases from the interior of said chamber means by way of said vent line, and odor reducing means including a heat activated catalyst located outside of said chamber means and between said outer wall thereof and said gas removal means and in the flow path of gases passing through said vent line.

10. The incinerator toilet of claim 9 wherein:

said vent line extends through an opening formed in said outer wall to an opening formed in said inner wall and is in fluid communication with said enclosed and surrounding chamber in which is located said heat insulation material.

11. The incinerator toilet of claim 10 wherein:

said incinerator chamber means has an upper end and a lower end with a central opening extending therethrough, said incinerator chamber means being formed by said inner and outer walls, each of which are formed from a single cylindrical piece of drawn metal, said inner and outer walls having at their upper ends inwardly extending flanges connected together and which extend downwardly below the top level of said upper end of said chamber means, bowl means located above said chamber means, and a removable pan adapted to be located below the lower end of said chamber means.

12. The incinerator chamber of claim 11 wherein:

said heating means comprises an electrical heating coil adapted to be located within said central opening of said incinerator chamber means at a position spaced inwardly of said inner wall, said heating coil having two spaced extending terminal ends, openings formed through said inner and outer walls for receiving said terminal ends to allow said terminal ends to project outwardly beyond said outer wall of said incinerator chamber means, a small container of heat insulation material secured to said outer wall and having openings formed therethrough for receiving said terminal ends to allow said terminal ends to extend through said small container and through its heat insulation material, and brackets adapted to be removably attached to said inner wall for removably supporting said coil within said central opening.

13. The incinerator chamber of claim 12 wherein:

said inner wall has a single opening for receiving said two spaced terminal ends, and said outer wall has two spaced smaller openings in alignment with said single opening for receiving said two spaced terminal ends.

14. The incinerator chamber of claim 13 wherein said small container comprises:
a cup-shaped member having a first end and an opposite open end,
a removable lid adapted to close said open end,
said first end of said cup-shaped member having two spaced openings formed therethrough,
said first end of said cup-shaped member being secured to the outside of said outer wall of said incinerator chamber means in a position such that said two spaced openings of said first end of said cup-shaped member are in alighment with the two spaced openings formed to said outer wall for receiving said two spaced terminal ends of said coil,
said lid having two spaced openings formed therethrough for receiving the two spaced terminal ends of said coil to allow said lid to fit over and close said open end of said cup-shaped member with said two spaced terminal ends of said coil extending outward therefrom.

15. The incinerator chamber of claim 14 comprising:
a second cup-shaped member having a first end and an opposite open end,
said first end of said second cup-shaped member having two spaced openings formed therethrough and which correspond with the two spaced openings formed through said outer wall of said chamber means,
said second cup-shaped member being located in said annular chamber between said inner and outer walls with its first end secured to the inside of said outer wall with its two spaced openings in alignment with the two spaced openings of said outer wall and with its open end in alignment with single opening of said inner wall.

16. The incinerator toilet of claim 9 wherein:
said vent line extends through an opening formed in said outer wall to an opening formed in said inner wall and is in fluid communication with said enclosed and surrounding chamber in which is located said heat insulation material,
said heating means comprises a helically wound electrical heating coil adapted to be located within said central opening of said incinerator chamber means at a position spaced inwardly of said inner wall and to one side of said opening formed through said inner wall,
metallic plate means having an area greater than the area of said opening formed through said inner wall and adapted to be coupled to the inside of said heating coil in front of said opening formed through said inner wall such that gases flowing to said opening formed through said inner wall must flow around said plate means.

17. The incinerator toilet of claim 9 wherein:
said outer wall has an opening formed therethrough to which is coupled said vent line,
said inner wall has a plurality of smaller openings formed therethrough which are spaced apart from each other and which are located within an area much larger than the cross-sectional area of said opening formed through said outer wall,
said area in which said smaller openings are formed being located in front of said opening formed through said outer wall, and
structure located in said enclosed and surrounding chamber and extending between said inner and outer walls completely around said smaller openings and forming a passageway from said smaller openings to said opening formed through said outer wall.

18. The incinerator toilet of claim 9 wherein:
the total cross-sectional area of said smaller openings is much less than the opening of said outer wall.

* * * * *